United States Patent [19]

Aimo et al.

[11] 3,759,153

[45] Sept. 18, 1973

[54] LENS SHADE

[75] Inventors: Karl H. Aimo, Cambridge; Philip G. Baker, Peabody, both of Mass.

[73] Assignee: Polaroid Corporation, Cambridge, Mass.

[22] Filed: Oct. 25, 1972

[21] Appl. No.: 300,809

[52] U.S. Cl. .................. 95/11 R, 95/10 PO, 350/58
[51] Int. Cl. ........................ G01j 1/06, G03b 17/12
[58] Field of Search .............. 95/10 R, 10 C, 10 PO, 95/11 R, 42; 350/58

[56] References Cited
UNITED STATES PATENTS
3,696,720  10/1972  Vinson .................................. 350/58
2,612,824  10/1952  Kroemmelbein, Jr. .............. 95/11 R Primary Examiner—Joseph F. Peters, Jr.
Attorney—John S. Vale et al.

[57] ABSTRACT

A lens shade is provided for use with compact photographic apparatus, e.g., a camera, of the type having an objective lens and a light sensing device mounted thereon in close proximity to one another. The lens shade extends outwardly from the camera housing and shades the lens without blocking its field of view, however, the shade does extend into the overlapping field of view of the light sensing device. To overcome this problem, the lens shade is provided with a light transmitting section or louvered opening therein for selectively transmitting and directing light from portions of the overlapping field of view to the light sensing device.

21 Claims, 7 Drawing Figures

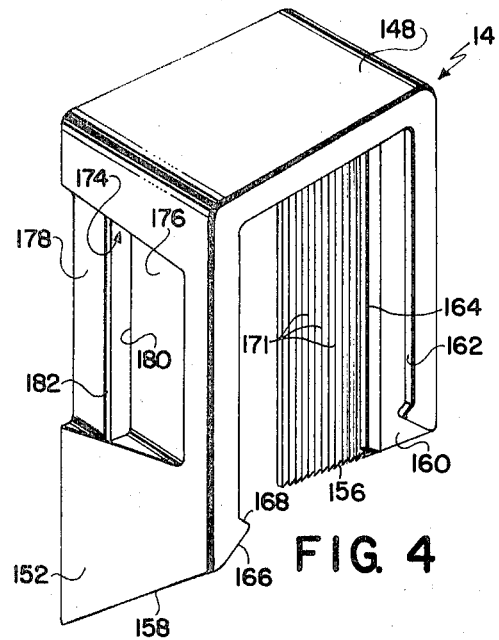
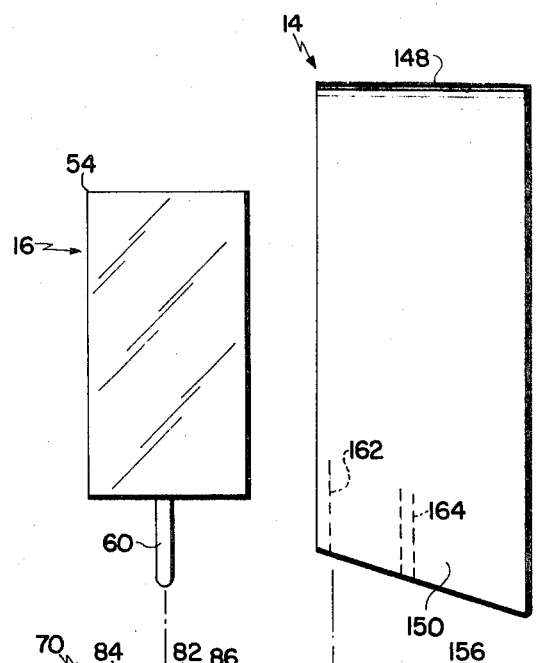
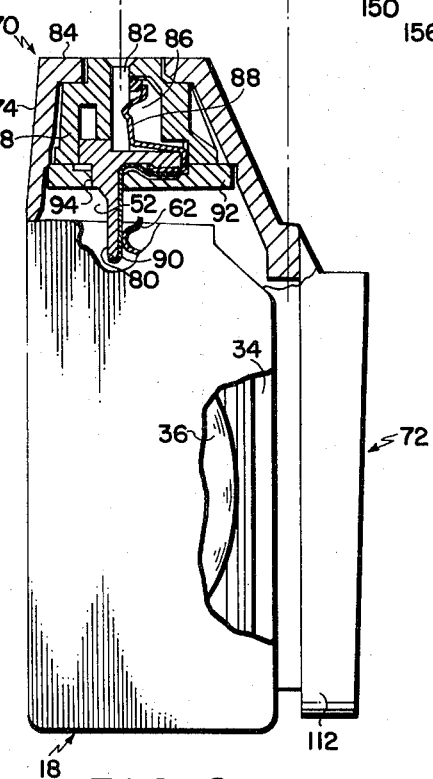

LENS SHADE

BACKGROUND OF THE INVENTION

1. Field of the Invention

The present invention relates to the field of photography and, more particularly, to a lens shade adapted for use with photographic apparatus of the type including an objective lens and a light sensing device for evaluating lighting conditions in the field of view of the objective lens.

2. Description of the Prior Art

Lens shades or hoods are commonly mounted on the end or around a camera's objective lens to selectively block light emanating from points or sources outside of the objective lens's field of view.

If light rays from a bright source outside of the field of view impinge upon the front surface of the lens, at least a portion of the light may be transmitted through the lens and show up on the negative or positive print as a highly overexposed spot or irregular patch.

The most regularly encountered bright light source outside of the lens' field of view is overhead sunlight. Also, when using flash illumination, a highly reflective object just outside of the field of view may reflect light from the flash lamp onto the lens surface.

Generally, the prior art lens shade comprises an open ended extension member that projects forwardly of the front surface of the objective lens and "shades" the lens without intruding into the field of view. Of course, the dimensions of the lens shade opening and the amount of extension beyond the lens front surface are dictated by the focal length of the lens and its corresponding acceptance angle.

An important design criteria for any lens shade is that its presence on the camera must not impede the operation of any of the other camera components.

For example, many cameras have some sort of light sensing device or photocell mounted thereon for evaluating lighting conditions of the scene to be photographed to establish optimum exposure parameters. The photocell is generally mounted behind a window or light collecting lens on the face of the camera housing.

The photocell, or more precisely the window or lens, has a field of view that overlaps the field of view of the objective lens. Even though the objective lens and photocell window are spaced apart on the camera housing, the overlap is sufficient at a given distance from the lens (usually the minimum focusing distance) so that the photocell "sees" the same scene as the lens or at least a predetermined portion of the scene as in the case of center weighted exposure control systems.

Usually the photocell window is sufficiently spaced from the objective lens so that a lens shade projecting forwardly of the objective lens does not extend into the field of view of the photocell and block portions of the light emanating from the scene to be photographed.

However, the lens shade of the instant invention is expressly designed for use with extremely compact cameras.

Examples of such cameras may be found in U. S. Pat. Nos. 3,641,889 and 3,678,831. These particular cameras are of the self-developing type and include a small (4 × 1.5 × 0.75 inch) lens housing which mounts thereon; an adjustable objective lens; a photocell window; a lens focusing wheel; a light/dark control wheel; a camera cycle start button; a flash unit socket; and a remote start switch cable connector.

The objective lens is designed to focus on objects as close as eleven inches away. This coupled with the fact that the lens housing is extremely small and already overcrowded with a plurality of components means that the photocell window must be positioned in close adjacent relationship with the objective lens (approximately 0.5 inch apart).

Therefore, it is impractical to utilize the type of lens shade that is commonly found in the prior art because it would extend into the photocell's field of view and block scene light therefrom thereby giving an incorrect exposure reading.

SUMMARY OF THE INVENTION

The present invention provides a simple and unique lens shade that is especially well suited for use with a compact camera of the type including a housing having an objective lens and light sensing device or photocell mounted in close proximity thereon.

In a preferred embodiment, the shade comprises a molded U-shaped member having a generally planar top wall and a pair of generally planar side walls depending from the lateral edges of the top wall. These three walls bound a front to rear opening. The bottom of the shade, or the open end of the U, is open since the particular camera with which the lens shade is adapted to be used includes structure beneath the objective lens that extends forwardly of the lens and blocks light emanating from points below the bottom of the camera housing.

When positioned in front of the objective lens, the lens shade extends outwardly with the top wall positioned over the objective lens and the two depending side walls positioned on either side of the lens. The forward to rear dimensions of the lens shade, or the distance that it extends outwardly in front of the objective lens, is chosen such that the lens shade does not extend into the field of view of the objective lens.

However, a portion of one of the two side walls extends outwardly between the objective lens and the closely adjacent (approximately ½ inch space) photocell window and intersects at least a portion of the window's field of view.

To prevent this side wall portion from blocking the light path to the photocell window, a light transmitting section is provided in this one side wall. The light transmitting section preferentially permits light within the photocell's field of view to pass therethrough and at the same time substantially blocks light rays that emanate from points outside of the objective lens' field of view.

In a preferred embodiment, the light transmitting section may take the form of one or more louvered or angled openings in the one lens shade side wall. The angle of the one or more openings is selected to provide minimum light loss in the optical path to the photocell while providing maximum light blocking of light rays that originate from points outside of the optimum lens field of view.

In one preferred embodiment, the lens shade is configured to be mounted on an accessory holder that is in turn coupled to the camera. The accessory holder is part of an accessory mounting system that is described in copending application Ser. No. 300,820, filed on even date herewith. For that reason, the accessory mounting system will be described in detail hereinafter.

In another preferred embodiment, the lens shade is provided with a mounting band that is adapted to snap onto the camera's lens housing.

Therefore, it is an object of the present invention to provide a lens shade that has a light transmitting section in one of its walls for transmitting light therethrough to impinge upon a photocell when the lens shade is mounted in front of an objective lens.

Another object of the invention is to provide a lens shade that is adapted for use with photographic apparatus of the type including an objective lens and a light sensing device mounted thereon such that their respective fields of view overlap, said lens shade including light blocking means for preventing light emanating from points outside of the objective lens' field of view from impinging upon the objective lens, said light blocking means being configured to extend into the field of view of the light sensing device, and said shade further including a light transmitting section in a portion of the light blocking means for transmitting light emanating from portions of the overlapping fields of view to the light sensing device.

It is yet another object of the present invention to provide a lens shade that is part of a system for mounting accessories on a camera.

Another object of the present invention is to provide a lens shade that is adapted to be mounted on a camera which includes structure thereon that shades a portion of the camera's objective lens, said shade being configured to cooperate with that structure to shade the remaining portions of the objective lens.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 2 is a side elevational view, partly in section, of the lens housing of FIG. 1 with the universal holder mounted thereon and the lens shade embodying the present invention positioned above the holder in preparation to connecting it to the holder;

FIG. 3 is a rear elevational view, partly in section, of the universal accessory holder of FIG. 1;

FIG. 4 is a perspective view of the lens shade embodying the present invention showing a louvered light transmitting section in one side wall thereof;

DESCRIPTION OF THE PREFERRED EMBODIMENT

Figure 1:
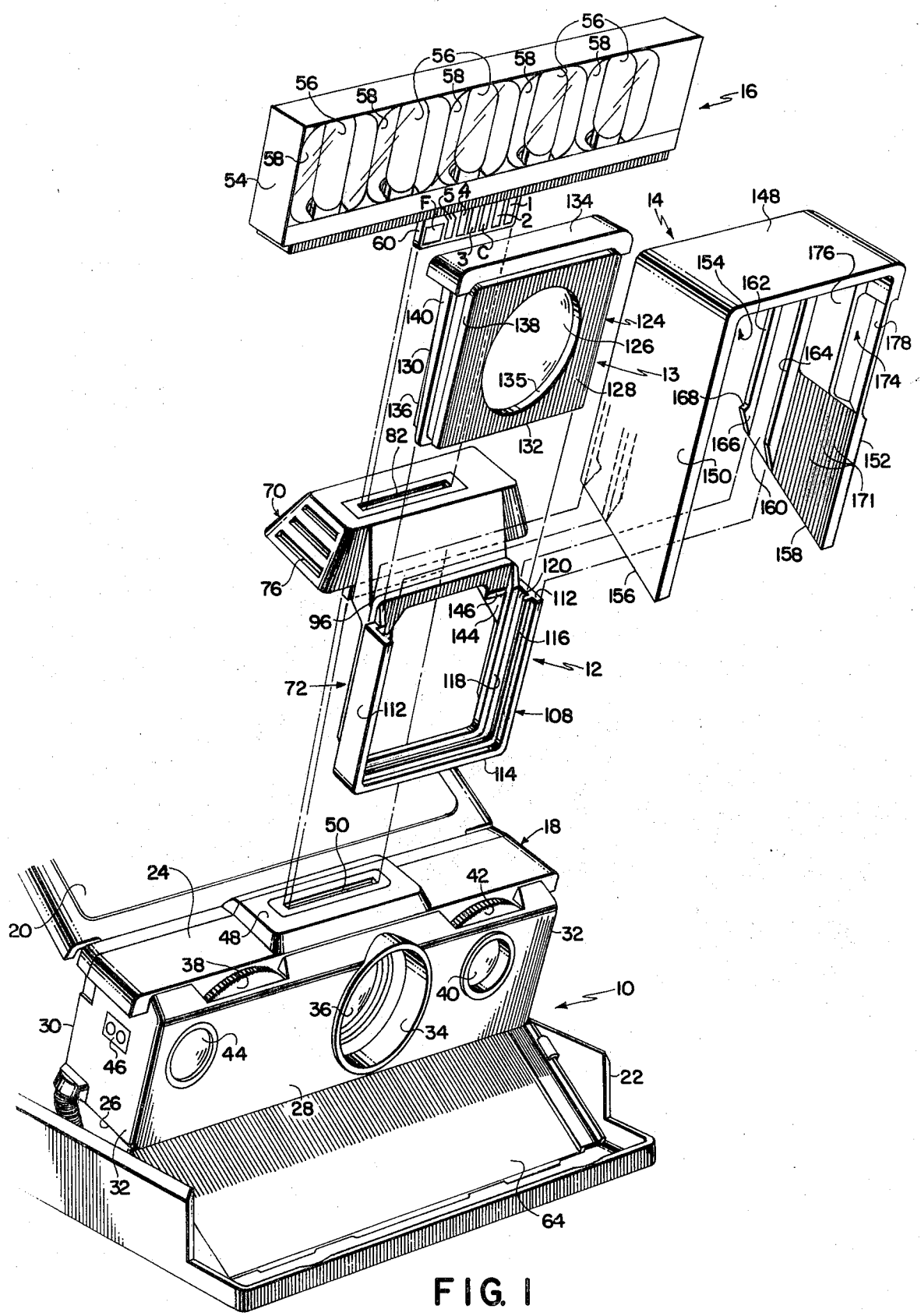
FIG. 1 is a perspective view, showing in exploded fashion, the forward end of a compact self-developing camera that includes a compact parallelepiped shaped lens housing, a universal accessory holder, a typical lens or filter accessory that is adapted to be inserted into the holder, a lens shade embodying the present invention that is adapted to be connected to the holder, and a linear flash array that is adapted to be plugged into a flash socket on the holder or lens housing.

FIG. 1 shows the front end of a compact self-developing camera 10, a universal accessory holder 12, a typical accessory lens or filter insert 13, a lens hood 14 embodying the present invention, and a linear array flash unit 16.

Camera 10 includes a housing formed by a plurality of housing sections which are pivotally interconnected for movement between a folded position and the operative extended position of FIG. 1.

For the sake of clarity and brevity, only the forward end of the camera will be shown and described since other parts of the camera are not involved with the instant invention.

We are principally interested in a lens housing 18 which is pivotally connected along its upper rear edge to an adjacent housing section 20 and along its bottom rear edge to a lower housing section (not shown) such that it is positioned in overlying relation to a forwardly extending housing section 22 when the camera is extended.

Lens housing 18 is formed by a top wall 24, a bottom wall 26, a forward wall 28, a rear wall 30, and a pair of side walls 32. These walls cooperate to define a relatively compact generally parallelepiped shaped housing measuring approximately 4 inches wide, 1.5 inches high, and 0.75 inch deep (from forward wall 28 to rear wall 30).

Disposed in forward wall 28 is a circular opening 34 for a moveably mounted objective lens 36 aligned therewith having its optic axis substantially normal to the plane of wall 28. At least the front lens element is adapted to be moved toward and away from wall 28 for focusing purposes by means of a rotatable focusing wheel 38 coupled integrally thereto.

Adjacent to lens 36 (spaced to the right approximately .5 inches) is a window 40 or collecting lens for admitting scene light into housing 18 such that it may impinge on a photocell (not shown) behind the window 40. The photocell forms parts of the camera's automatic exposure system. The amount of light striking the photocell may be varied by rotating a light/dark control wheel 42 to progressively introduce a wedge type neutral density filter into the optical path between window 40 and the photocell.

Within housing 18, but not shown in the drawings, is an electrically operated shutter, a complex electrical circuit board holding exposure control, flash, and camera operating circuits, a follow focus mechanism for flash mode operation, and other structure which need not be described here to understand the instant invention.

To the left (as viewed in FIG. 1) of focus wheel 38 is a camera cycle start button 44 for initiating a cycle of camera operation. The camera may also be operated from a remote location by connecting a suitable electronic switch cable to the socket 46 provided on housing side wall 32.

The top wall 24 of housing section 18 preferably includes an integrally formed, raised flash unit support pedestal 48 having an elongated opening 50 therein which communicate with and provides access to a flash unit socket or cavity 52 directly below opening 50 (see FIG. 2).

As best shown in FIG. 1, flash unit 16 comprises a generally parallelepiped shaped housing 54 enclosing, behind a transparent window, a linear array of five electrically ignitable flash lamps 56 and their individual reflectors 58.

Centrally disposed and depending from the bottom of housing 54 is a thin elongated insulative terminal board and connecting plug 60 which is adapted to be inserted into socket 52 to releasably secure the flash unit 16 to the camera in the desired orientation with respect to the lens axis and to connect the lamps 56 to the camera's electronic circuitry.

Disposed on the front side of the terminal board 60 are 7 vertically oriented and adjacently spaced conductive paths or contacts designated (from right to left in FIG. 1) 1, 2, C, 3, 4, 5, and F.

The contacts 1, 2, 3, 4, and 5 are connected, respectively, to one end of the filament wire of each of the five lamps 56 in the array. The sixth terminal C is connected to the other end of the filament wires of all five lamps. Thus electrical contact to the first lamp may be made by contacting contacts 1 and C. The second lamp may be contacted by making electrical connection to contacts 2 and C, etc.

The seventh conductive contact F is double the width of the others and is used to short out two terminals 62 in the camera socket 52 to convert the camera to its flash mode of operation. It will be noted that contact F is not electrically connected to any of the lamps in the array.

In a preferred embodiment the flash unit has a second set of five lamps and reflectors and seven contacts on the reverse side of the flash unit 16.

The flash socket 52 is provided with eight vertically disposed, spaced, rearwardly facing spring contacts 62 therein (only one is shown in FIG. 2). The first six contacts within the socket are arranged to be in alignment with contacts 1, 2, C, 3, 4, and 5, respectively. The last two are aligned with the wide contact F.

With the terminal board 60 fully inserted into socket 52, the socket contacts 62 frictionally engage and make electrical contact to contacts 1, 2, C, 3, 4, 5, and F. The seventh and eighth contacts 62 are shorted together by contact F to close a normally open switch within the electronic circuit to convert the camera from the daylight to the flash mode of operation.

Without going into detail, the camera is provided with an electronic logic circuit for sequentially firing the lamps 56 without having to resort to a mechanical indexing system.

During a cycle of camera operation, initiated by actuating button 44, a film unit is exposed, either with or without flash illumination, and then is automatically advanced from its exposure position into engagement with a pair of processing rollers. The rollers are located beneath lens housing 18 and are blocked from view in FIG. 1 by a light baffle 64 mounted on housing section 22.

The rollers are rotatably driven to advance the film unit therebetween to progressively apply a compressive pressure along its length. As is well known to those who are familiar with instant photography, the pressure dispenses and distributes a processing fluid within the film unit to initiate a diffusion transfer process.

The liquid treated film unit exits from an opening on the underside of housing section 22.

For those that are interested in the details of the camera and film, reference may be had to the following disclosures; U. S. Pat. Nos. 3,641,889; 3,678,831; and 3,415,644; all of which are assigned to the same assignee as the present invention.

It is desirable in some photographic situation to modify the performance range of the camera and film combination.

Most modifications have to do with accessories, such as supplementary lenses, filters, and lens shades, that are mounted in front of or around the objective lens 36. However, other accessories that modify the performance of the photocell or the flash unit may also be employed.

For example, if a light attenuating filter is used on the objective, it is generally desirable to use some sort of light attenuating filter in front of the photocell to keep the automatic exposure control system in balance.

Likewise, if the field of view of the lens 36 is changed by means of a supplementary lens, a second supplementary lens may be positioned in front of window 40 to change the light acceptance angle of the photocell.

In some situations it may be desirable to modify the color of the light emitted from the flash unit lamps by using a suitable filter. In other instances, one may want to position a polarizing filter in front of the flash unit and cross-polarizing filter in front of the objective lens 36.

One of the most frequently used accessories is a lens shade. Its primary function is to block light rays emanating from points outside of the objective lens field of view to prevent such rays from striking the front surface of the objective lens.

An accessory mounting system that is the subject matter of a copending application, Ser. No. 300,820, filed on even date herewith, comprises a universal accessory mount or holder 12 and a plurality of accessories such as the filter or lens accessory 13 and the lens shade 14 shown in FIG. 1, that are adapted to be connected to holder 12 to place them in operative relationship with component parts of the camera or flash unit.

The accessory holder 12 is generally formed as an L-shaped structure comprising a first section 70 adapted to overlie the top wall 24 of camera housing section 18 and an integrally formed second section 72 disposed at substantially right angles to section 70 such that it overlies the forward wall 28 of housing section 18.

In a preferred embodiment accessory holder 12 and selected parts of the accessories that are adapted to be coupled thereto may be conveniently molded from any suitable plastic material such as a high-impact, styrene-type, thermoplastic resin supplied under the trademark Cycolac Grade D. H. by the Marbon Chemical Division.

The first holder section 70 comprises a hollow, thin walled, open ended, pedestal cap 74 which generally conforms to the shape of the raised flash socket pedestal 48 on housing 18 and is adapted to snuggly fit thereover. Cap 74 preferably includes integrally formed recesses 76 on its exterior lateral surfaces to provide a convenient gripping surface when attaching or removing the holder to the camera.

Mounted within the cap 74 is an auxiliary flash socket and holder connecting assembly. It comprises an elongated flash unit socket 78 which is essentially a duplicate of socket 52 provided in camera lens housing 18 and an integrally formed plug or terminal board connector or coupling means 80 depending therefrom for connecting holder 12 to the camera flash socket.

The holder socket 78 is characterized by an elongated opening 82, disposed in the same plane as the top planar surface 84 of cap 74, which communicates with an elongated cavity 86 therebelow that generally conforms to the shape of the flash unit terminal board 60.

Socket 78 is provided with eight vertically disposed, spaced, and rearwardly facing contact springs 88 (only one is shown in FIG. 2) for making simultaneous frictional and electrical contact to the conductors 1, 2, C, 3, 4, 5, and F on the flash unit terminal board 60.

Depending from the bottom of socket 78 is the elongated insulated terminal board and connector or coupling means 80 which is generally the same size and shape as the terminal board 60 on the flash unit 16. It is provided with eight vertically disposed and spaced electrically conductive contacts 90 on one side thereof (to the right as viewed in FIG. 2). One end of each of the conductive contacts 90 (see FIG. 3) terminates at the bottom edge of terminal board 80. The opposite ends are electrically connected to the lower ends of their counterpart electrical contacts 88 within socket 78.

As best shown in FIG. 2 a planar pad 92 having an opening 94 therein is provided for holding the socket and connector assembly within cap 74. The terminal board 80 is inserted through opening 94 and this assembly is inserted through the bottom opening in cap 74 to position the open end of socket 74 in alignment with the top opening of cap 74. With the assembly fully inserted, the edges of pad 92 may be permanently attached to the interior surface of the hollow cap 74 by any convenient method such as ultrasonic or adhesive bonding.

It will be noted that the lower end of terminal board or connector 80 extends below the bottom edge of cap 74 by a distance long enough to insure that it will be fully inserted into the flash unit socket 52 on the camera when the bottom edges of cap 74 engage and are supported by the exterior surface of the lens housing top wall 24.

The accessory holding portion of 72 of holder 12 is attached to the leading lower edge of cap 74 by means of an integrally molded section 96 that provide the right angle connection between holder sections 70 and 72.

While section 72 is an integrally molded structure, it will be described as consisting of component parts for the sake of clarity.

Looking at FIG. 3 which is a rear elevational view of holder 12 with a portion of the rear wall of cap 74 cut away to expose the terminal board 80, it will be noted that the terminal board 80 is not centrally disposed between the lateral edges of cap 74 but is closer to the right hand edge (in FIG. 3).

It will be noted from FIG. 1 that the camera flash socket 52 is not symmetrically disposed with respect to the lens axis. This is to position the center lamp 56 in the array in a more desirable off axis relationship with respect to the objective lens.

The asymmetrically disposed terminal board compensates for this arrangement and thereby positions the accessory holding portion 72 directly in front of the objective lens 36.

The rearwardmost portion of section 72 comprises a generally U-shaped planar member 98 which includes a horizontal section 100 and a pair of elongated arms 102 depending from the lateral edges thereof. Gusset sections 104 are preferably provided at the intersections of section 100 and arms 102 to add strength and rigidity to the upper end of member 98.

It will be noted that the lower ends 106 of arms 102 are tapered at an acute angle with respect to the vertical. As will be described later the ends 106 serve as a locking detent for securing the lens shade 14 to holder section 72.

For the purposes of this disclosure, the holder cap 74, the integrally formed right angle connector 96, and the rearwardmost portion 98 of section 72 will be defined as a support member or base of holder 12 on which are mounted the flash socket 78, the terminal board connector 80, and an accessory receiving and holding member 108 to be described below.

The rearwardmost planar surface of member 98 is adapted to abut the exterior surface of lens housing 18 around lens 36 when the holder 12 is attached to camera 10. Integrally formed with its forwardmost surface and projecting forwardly therefrom is a generally U-shaped member 108. The closed end of U-shaped member 108 is at the bottom (as shown in FIG. 3) while the closed end of U-shaped member 98 is at the top. In combination they cooperate to form a generally rectangular frame to define a central opening 110 in holder section 72 that is larger than and is adapted to be coaxially disposed with objective lens 36.

As best shown in FIG. 1, member 108 comprises a pair of vertically disposed side members 112 and a horizontally disposed member 114 that connects the lower ends of side members 112.

Integrally formed on the interior surface of U-shaped member 108 are a pair of generally U-shaped projections 116 and 118 which cooperate with members 112 and 114 to define a pair of accessory guide and receiving channels 120 and 122 for receiving an accessory 13 of the type shown in FIG. 1.

This type of accessory 13 comprises a generally rectangular or square accessory mounting plate 124 or insert that is adapted to be inserted into the channels 120 and 122 on holder member 108 in combination with an appropriate accessory 126 (e.g., lens or filter) mounted thereon.

Plate 124 comprises a forward planar wall 128, a rear planar wall 130, a bottom wall 132, a top wall 134 and a pair of side walls 136. The forward and rear walls have coaxially disposed openings 135 and 137 therein between which an accessory lens or filter 126 is mounted.

It will be obvious to one skilled in the art that plate 124 may be fabricated in two parts. For example, top wall 134 may be fabricated separately and then bonded to the top of forward and rear walls 128 and 130 after the accessory lens or filter has been inserted therebetween.

In order to releasably secure plate 124 to holder member 108, plate 124 is provided with a pair of asymmetrically disposed (with respect to the given forward to rear dimension or thickness of plate 124) projections 138 and 140 that are adapted to be received in holder channels 120 and 122. The forwardmost projection 138 is substantially an extension of the planar forward wall 128 and extends outwardly from side walls 138 and bottom wall 132. The rearwardmost projection 140 is set slightly forwardly (to the right as viewed in FIG.

2) of rear wall 130 and also extends outwardly from side walls 136 and bottom wall 132.

The forward accessory plate projection 138 fits within the forward holder channel 122 and the rearward projection 140 fits into channel 120. The accessory 13 then may be moved downwardly into its fully inserted position within holder 108 to position the accessory lens or filter 126 in front of the camera's objective lens 36.

It will be noted that the actual connection between the holder and the accessory insert is provided by the insertion of projection 140 into channel 120. Projection 138 and channel 122 are provided to produce an aesthetically pleasing interface between the holder and the accessory insert and are not necessary or critical parts of the instant invention.

The top wall 134 of accessory mounting plate 124 extends outwardly beyond the side walls 136 and overlie the tops of holder sidewalls 112 when the insert 124 is in its fully inserted operative position. In a preferred embodiment, the top wall 134 also extends just slightly beyond the exterior lateral surfaces of sidewalls 112. This provides a pair of convenient lateral gripping surfaces for lifting the insert plate 124 out of holder section 108.

In a preferred embodiment the insert plate is slightly tapered in its lateral dimension to reduce in size from the top of the plate to its bottom. Channels 120 and 122 are also tapered in a confirming manner. This type of structure makes it easier for the user to insert the narrower bottom of plate 124 into the wider upper ends of channels 120 and 122.

In order to releasably lock insert plate 124 in its fully inserted position, a depressible detent spring (not shown) is provided in the rear wall 130 of plate 124. As best shown in FIG. 1, holder member 108 is provided with a forwardly facing recess 144 for receiving the outwardly extending spring to lock plate 124 in holder section 108. As plate 128 is lifted from holder section, an inclined surface 146 of recess 144 bears against spring and depresses it into the rear wall 130 thereby unlocking plate 124.

It will be noted that the asymmetrical front to rear disposition of the projection 140 on plate 124 prevents the plate front being inserted into holder in a backwards manner. Also the lateral extensions on top wall 134 prevent it from being inserted upside down.

One embodiment of the lens shade 14 that is part of the accessory mounting system described above comprises a generally U-shaped light blocking member or means formed by three substantially planar, light opaque walls. These three walls include a top wall 148, a left (as viewed in FIG. 1) side wall 150 depending from the left lateral end of top wall 148 and a right side wall 152 depending from the right lateral end of top wall 148. Walls 148, 150, and 152 cooperate to define three sides of a boundary for a central front to rear lens shade opening 154.

It will be noted that the bottom of the U, between the lower ends of side walls 150 and 152, is open. The fourth side of the boundary for opening 154 is provided by the inclined light baffle 64 mounted on camera housing section 22 when the lens shade 14 is mounted on camera 10 as will be described hereinafter. For this reason the lower ends 156 and 158 of side walls 150 and 152, respectively, are inclined at a conforming angle.

In order to mount lens shade 14 on the accessory holder section 108, a U-shaped coupling channel 160, defined by a rear inward projection 162 and a forward inward projection 164 integrally formed with the interior surface of top wall 148 and side walls 150 and 152, and the interior surface of walls 148, 150, and 152 therebetween, is provided.

As best shown in FIG. 2, the shade 14 is positioned over the accessory holder 12, mounted on camera 10, such that the open ends of channel 160, at the bottom of side walls 150 and 152, are in alignment with the top ends of the holder side walls 112. Lens shade 14 is then moved downwardly and is slideably inserted over the exterior surfaces of holder side walls 112 until it reaches its fully inserted operative position.

Figure 5:
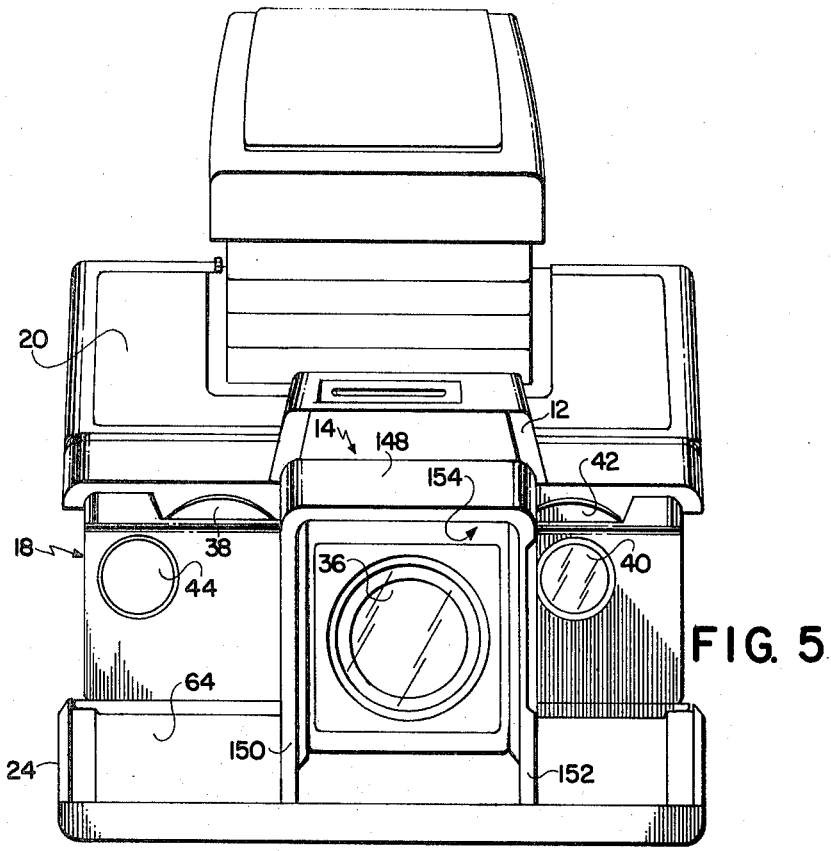
FIG. 5 is a front elevational view of the camera of FIG. 1 showing the lens shade embodying the instant invention in its operative position thereon.

As best shown in FIG. 5, the inclined lower ends 156 and 158 of lens shade side walls 150 and 152 are positioned in overlying relationship to the exterior surface of the inclined light baffle 64 on housing section 22. Thus light baffle 64 serves to close the open bottom end of the U-shaped lens shade 14 and define the bottom boundary of the now generally rectangular central opening 154.

It will be noted that the portion of lens shade channel 160 on the underside of top wall 148 is sufficiently wide to accommodate the top wall 134 of an accessory insert 13. Therefore, the accessory insert 13 and lens shade 14 may be mounted on the accessory holder 12 either simultaneously or alone.

As best shown in FIG. 1, the lower ends of the rear lens shade projection 162 are provided with a pair of inwardly facing extensions 166. Extensions 166 serve as latch means or detent and mechanically interlock with the lower angled ends 106 of holder arms 102 (see FIG. 3) when the lens shade 14 is in its fully inserted operational position. The lens shade 14 may be removed from holder 12 simply by lifting it upwardly. The downwardly angled surfaces 168 of detents 166 slide along the angled surfaces of ends 106 and cam the detents 166 outwardly so that they disengage from ends 106.

Lens shade 14 may be molded as a unitary structure. Any suitable plastic material may be used, e.g., a high-impact, styrene-type, thermoplastic resin supplied under the trademark Cycolac Grade D. H. by the Marbon Chemical Division.

When used with the camera 10 shown in FIGS. 1 and 5, the lens shade measures approximately 1.78 inches laterally across top wall 144, and 0.9 inches deep (forward to rear dimension). The side walls measure approximately 1.9 inches at the front and 1.5 inches at the rear from top wall 148 to the bottom edge. Wall thicknesses range from 0.040 to 0.090 inches.

Figure 6:
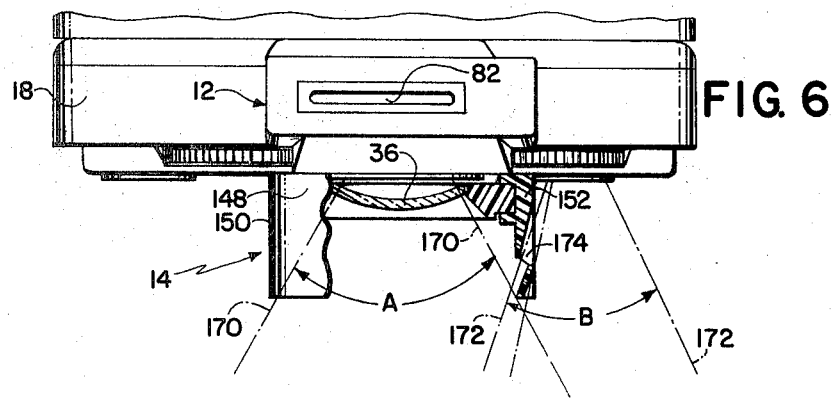
FIG. 6 is a top elevational view of FIG. 5 showing the overlapping fields of view of the camera's objective lens and photocell.

As best shown in FIGS. 5 and 6, the camera mounted lens shade 14 is centered in front of the objective lens 36. The top wall 148 and the side walls 150 and 152 extend outwardly from lens housing 18 in a direction that is substantially normal to the front wall 28 of housing 18. Top wall 148 is positioned over the lens 36, left side wall 152 is to the left, and right side wall 152 is to the right side of the lens 36, between the objective lens 36 and the photocell window or collecting lens 40.

In FIG. 6, the objective lens field of view is diagrammatically represented by the broken lines 170. The angle A subtended by lines 170 is intended to be representative of the solid angle or field that the lens 36 "sees." This angle is determined by the lens focal length and film diagonal combination and therefore absolute values will not be assigned to angle A or any other angles to be described hereinafter.

What is important is that the mounted lens hood walls 148, 150 and 152 and the camera light baffle 64 are dimensioned so that they do not extend into the field of view A and block light rays emanating from sources within field A. Their function is to block rays emanating from points or sources outside of field A (such as overhead sunlight) so that those rays do not strike the front surface of objective lens 36. Thus lens shade 14 selectively "shades" the objective lens by only allowing light from the field A to pass through the square or rectangular opening 154 to impinge objective lens 36.

It will be noted that the interior surfaces of lens shade walls 148, 150, and 154 are preferably provided with a series of narrow V-shaped channels or baffles 171 therein. Their function is to reduce the reflective characteristics of the interior surface to prevent out of field light from being reflected therefrom onto the front surface of lens 36.

As best shown in FIG. 5, the photocell window or collecting lens 40 is closely adjacent to the objective lens. This close spacing is necessary because of the small dimensions of the lens housing 18.

The photocell window or collecting lens 40 has a field of view B subtended by broken lines 172. The solid angle B may in some instances equal angle A or in other instances be smaller or larger than A depending on the type of exposure control system utilized.

For the purposes of this disclosure it will be assumed that the field angle B is slightly smaller than A to give a center-weighted characteristic to the exposure control system.

The function of the photocell system is to "look at" a selected portion of the objective lens field of view A and sense light conditions to provide exposure parameters. In most instances the photocell reads the average light intensity of the selected portion of field of view A.

Even though the lens 36 and photocell window or lens 40 are spaced approximately one half inch from one another on the lens housing front wall 28, for all practical purposes the fields of view A and B overlap at a short distance away from the lens housing 18 so that the photocell "sees" the same field as the objective lens or at least predetermined portions thereof.

Looking at the diagrammatic representation of FIG. 6, it will be noted that the right side wall 152 of lens shade 14 does not extend into field of view A, but it does extend into field of view B. This is because of the close proximity of the lens 36 and photocell window 40 on the compact lens housing 18.

In order to prevent right lens shade side wall 152 from "shading" at least a portion of the photocell window, a light transmitting section or means is provided therein. The function of the light transmitting means is to allow preferential light passage through a portion of side wall 152. In other words, side wall 152 is configured to allow light originating in portions of the overlapping fields A and B to pass therethrough and impinge upon the photocell while at the same time it also substantially blocks light originating from points or sources outside of the lens field of view A.

In a preferred embodiment, the selective light transmitting means takes the form of an angled or louvered opening 174 in the right side wall 152.

As best shown in FIGS. 1 and 4, the louvered opening 174 is bounded by a first inwardly angled, substantially vertical section 176 of wall 152 and a second inwardly angled, substantially vertical section 178 of wall 152 located forwardly of section 176.

The degree to which sections 176 and 178 are angled with respect to the main portion of right side wall 152 will depend on the field angles A and B of the objective lens 36 and the photocell window 40 and the spacing between lens 36 and window 40.

Because of opening 174 and the angled exterior surface of louver section 178, light rays from selected portions of the overlapping fields A and B that are directed towards the interior surface of right side wall 152 will pass therethrough and impinge upon photocell window 40.

It will be noted that the leading edge 180 of louver section 176 and the trailing edge 180 of louver section 178 are in alignment or slightly overlap so that light impinging on the exterior surface of right side wall 152 may not pass through opening 174 and strike the front surface of objective lens 36.

One skilled in the art will understand that the louvered opening system is not 100 percent efficient. There is some light loss due to the fact that louver section 178 is in the optical path to the photocell. But for the most part the light loss is negligible.

In other embodiments the light transmitting means may include a plurality of narrower aligned louvered openings in right side wall 152. In still other embodiments the light transmitting section may comprise a transparent solid window or may include angled light pipes or fiber optic light transmission means.

Figure 7:
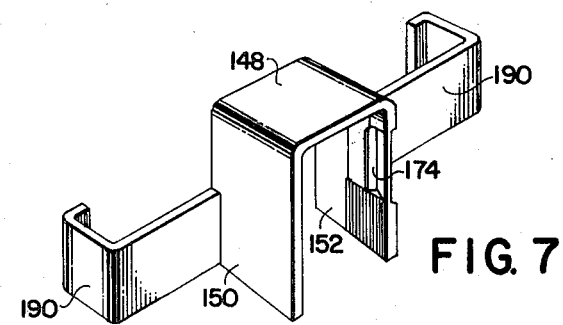
FIG. 7 is a perspective view of an alternate embodiment of the lens shade embodying the present invention.

FIG. 7 shows an alternate lens shade 14. It is intended to be mounted on camera 10 without employing the accessory holder 12 and includes a top wall 148, side walls 150 and 152, and a light transmitting section or louvered opening 174 in side wall 152.

It does not include an interior mounting channel 160. Instead, a pair of mounting arms 190 extend outwardly from side walls 150 and 152. They are formed of any suitable resilient material and are configured to snap around the lower portion of lens housing 18 to hold the lens shade 14 in its operative position in front of objective lens 36.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A lens shade for use with photographic apparatus of the type including an objective lens having a first field of view and a light sensing device, having a second field of view that overlaps the first field of view, for evaluating lighting conditions in the first field of view, said lens shade comprising:
light blocking means configured to surround at least a portion of the objective lens and extend forwardly therefrom, outside of the first field of view, for blocking light emanating from points outside of the first field of view to prevent said light from impinging upon the objective lens, said light blocking means being dimensioned such that at least a portion thereof extends into the second field of view of the light sensing device; and a light transmitting section in said portion of said light blocking means that extends into the second field of view for transmitting light emanating from portions of the overlapping first and second fields of view through said light blocking means such that it may impinge upon the light sensing device.

2. A lens shade as defined in claim 1 wherein said portion of said light blocking means that extends into the second field of view includes a light blocking wall that is adapted to be positioned between the objective lens and the light sensing device and said light transmitting section includes an opening in said wall.

3. A lens shade as defined in claim 1 wherein said light transmitting section is configured to selectively transmit light originating in the overlapping first and second fields of view and to selectively block light originating outside of the first field of view.

4. A lens shade as defined in claim 3 wherein said light transmitting section includes at least one louvered opening in said light blocking means.

5. A lens shade as defined in claim 1 wherein said light blocking means includes an opaque, U-shaped, light blocking member including a top wall and a pair of side walls depending from said top wall and said light transmitting section includes an opening in one of said side walls.

6. A lens shade as defined in claim 5 wherein said one side wall having said opening therein is adapted to be positioned between the lens and the light sensing device.

7. A lens shade as defined in claim 1 wherein the photographic apparatus includes a first housing section mounting the lens and light sensing device thereon in close proximity and a second housing section extending forwardly of the first housing section below the objective lens and said light blocking means includes a U-shaped light blocking member that is adapted to extend outwardly from the first housing section such that it surrounds three sides of the objective lens and overlies the second housing section such that said U-shaped member and the second housing section cooperate to completely surround the lens.

8. A lens shade as defined in claim 1 wherein said lens shade forms part of an accessory mounting system for mounting said lens shade on the apparatus and said system includes a holder that is adapted to be coupled to said apparatus and said light blocking means includes means thereon for coupling said lens shade to said holder.

9. A lens shade as defined in claim 8 wherein said means for coupling said lens shade to the holder includes a channel on said light blocking means that is adapted to be slidably mounted over an exterior surface of the holder.

10. A lens shade as defined in claim 8 wherein light blocking means includes detent means thereon for releasably securing said lens shade to the holder.

11. A lens shade as defined in claim 1 wherein said light transmitting means includes one or more openings in said light blocking means.

12. A lens shade as defined in claim 11 wherein said opening is at an angle with respect to said light blocking means for transmitting light directed at one side of said light blocking means and for blocking light directed at the opposite side of said light blocking means.

13. A lens shade as defined in claim 1 wherein said light transmitting section includes a transparent section in said light blocking means.

14. A lens shade as defined in claim 13 wherein said transparent section includes one or more fiber optic light pipes.

15. A lens shade as defined in claim 1 further including means integrally formed with said light blocking means for mounting said lens shade on the photographic apparatus.

16. A lens shade as defined in claim 15 wherein said mounting means includes a pair of mounting arms adapted to snap around at least a portion of the apparatus to hold said lens shade in an operative position in alignment with the objective lens.

17. A lens shade that is adapted to be mounted on a compact camera of the type including a compact housing section having an objective lens and a photocell window mounted thereon in close proximity to one another, the objective lens having a first field of view and the photocell window having a second field of view that overlaps the first field of view, said lens shade comprising:
a U-shaped light blocking member including a top wall and a pair of side walls depending from the ends of said top wall, said U-shaped member being adapted to be positioned in front of said housing section such that said top wall extends outwardly from said housing section over the objective lens and said side walls extend outwardly from the housing section on either side of said objective lens, said top and side wall being dimensioned not to extend into the first field of view, and one of said side walls being adapted to be positioned between the objective lens and the photocell window and being dimensioned to extend into the second field of view, said top and side wall serving to block light originating from points outside of the first field of view to prevent such light from impinging on the objective lens; and
means in said one side wall for selectively transmitting light from portions of the overlapping fields of view through said one side wall to the photocell window and for selectively blocking light directed towards said one side wall from points outside of the first field of view.

18. A lens shade as defined in claim 17 wherein said light transmitting means includes a louvered opening in said one side wall for directing and transmitting light directed towards one side of said one side wall to the photocell window.

19. A lens shade as defined in claim 18 wherein said louvered opening is bounded by forward and rear angled sections of said one side wall and the leading edge of one angled section overlaps the trailing edge of said second angled section to prevent light directed towards the opposite side of said one side wall from passing through said louvered opening.

20. A lens shade as defined in claim 17 further including a channel integrally formed with interior surfaces of said top and said pair of side walls for releasably coupling said shade to an accessory holder that is adapted to be mounted on the compact camera housing section.

21. A lens shade as defined in claim 17 further including means on interior surfaces of said top and side walls for reducing the reflectivity of said interior surfaces.

* * * * *